(12) United States Patent
Sandstrom et al.

(10) Patent No.: US 9,771,469 B2
(45) Date of Patent: Sep. 26, 2017

(54) TIRE WITH TREAD FOR COMBINATION OF LOW TEMPERATURE PERFORMANCE AND FOR WET TRACTION

(71) Applicant: The Goodyear Tire & Rubber Company, Akron, OH (US)

(72) Inventors: Paul Harry Sandstrom, Cuyahoga Falls, OH (US); Georges Marcel Victor Thielen, Schouweiler (LU); Pascal Patrick Steiner, Vichten (FR); Nihat Ali Isitman, Ettelbruck (TR)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/345,616

(22) Filed: Nov. 8, 2016

(65) Prior Publication Data
US 2017/0051135 A1 Feb. 23, 2017

Related U.S. Application Data

(63) Continuation-in-part of application No. 14/748,343, filed on Jun. 24, 2015.

(51) Int. Cl.
*C08L 9/06* (2006.01)
*B60C 1/00* (2006.01)

(52) U.S. Cl.
CPC ............... *C08L 9/06* (2013.01); *B60C 1/0016* (2013.01); *C08L 2203/00* (2013.01); *C08L 2205/02* (2013.01); *C08L 2205/025* (2013.01); *C08L 2205/03* (2013.01); *C08L 2205/035* (2013.01); *C08L 2205/06* (2013.01); *C08L 2207/324* (2013.01)

(58) Field of Classification Search
CPC ............. C08L 9/06; C08L 9/00; B60C 1/0016
See application file for complete search history.

(56) References Cited

U.S. PATENT DOCUMENTS

| | | | |
|---|---|---|---|
| 5,703,151 A * | 12/1997 | Yamamoto | C08K 3/36 524/262 |
| 6,448,318 B1 | 9/2002 | Sandstrom | |
| 7,919,553 B2 | 4/2011 | Kawasaki et al. | |
| 8,022,136 B2 | 9/2011 | Yano et al. | |
| 8,044,118 B2 | 10/2011 | Sakaki et al. | |
| 8,053,542 B2 | 11/2011 | Hamann et al. | |
| 8,100,157 B2 | 1/2012 | Hattori et al. | |
| 2004/0127617 A1 | 7/2004 | Vasseur et al. | |
| 2009/0131572 A1 | 5/2009 | Cambon et al. | |
| 2012/0016056 A1 | 1/2012 | Miyazaki | |
| 2012/0157568 A1 | 6/2012 | Sandstrom et al. | |
| 2013/0109800 A1 | 5/2013 | Weber | |
| 2013/0296471 A1 | 11/2013 | Lesage et al. | |
| 2014/0371346 A1 | 12/2014 | Saintigny et al. | |

FOREIGN PATENT DOCUMENTS

| | | |
|---|---|---|
| EP | 2460670 A1 | 6/2012 |
| EP | 2468815 A1 | 6/2012 |
| EP | 2733170 A1 | 5/2014 |
| WO | 2012085014 A1 | 6/2012 |

OTHER PUBLICATIONS

Goodyear Product Specification; DUD 1207, published at least as early as Apr. 18, 2013.
EPO search report received by Applicant dated Oct. 17, 2016.

* cited by examiner

*Primary Examiner* — Vickey Nerangis
(74) *Attorney, Agent, or Firm* — Henry C. Young, Jr.

(57) ABSTRACT

This invention relates to a tire with tread for promoting a combination of wet traction and service at low temperatures of a rubber composition containing a styrene/butadiene elastomer, cis 1,4-polybutadiene rubber, liquid high Tg styrene/butadiene polymer, resin and vegetable triglyceride oil.

4 Claims, No Drawings

TIRE WITH TREAD FOR COMBINATION OF LOW TEMPERATURE PERFORMANCE AND FOR WET TRACTION

FIELD OF THE INVENTION

This invention relates to a tire with tread for promoting a combination of winter service at low temperatures and for promoting wet traction comprised of a rubber composition containing a styrene/butadiene elastomer, cis 1,4-polybutadiene rubber, liquid high Tg styrene/butadiene polymer, resin and vegetable triglyceride oil.

BACKGROUND OF THE INVENTION

Tires are sometimes desired with treads for promoting traction on wet surfaces. Various rubber compositions may be proposed for tire treads.

For example, tire tread rubber compositions which contain high molecular weight, high Tg (high glass transition temperature) diene based elastomer(s) might be desired for such purpose particularly for wet traction (traction of tire treads on wet road surfaces). Such tire tread may be desired where its reinforcing filler is primarily precipitated silica which may therefore be considered as being precipitated silica rich.

Such rubber compositions often contain a petroleum based rubber processing oil to reduce the rubber composition's uncured viscosity and to thereby promote more desirable processing conditions for the uncured rubber composition. The petroleum based rubber processing oil can be added to the elastomer prior to its addition to an internal rubber mixer (e.g. Banbury rubber mixer) or be added to the rubber mixer as a separate addition to reduce the viscosity of the rubber composition both in the internal rubber mixer and for subsequent rubber processing such as in a rubber extruder.

Because of the high molecular weight of such high molecular weight elastomers, the uncured tread rubber compositions typically have a Mooney viscosity (ML1+4) (100° C.) which is generally too high (e.g. in a range of from 50 to 150) to be easily processable with ordinary rubber processing equipment unless very high shear processing conditions are used. Therefore, such rubber compositions often contain a petroleum based rubber processing oil to reduce the rubber composition's uncured viscosity and to thereby promote more desirable processing conditions for the uncured rubber composition. The petroleum based rubber processing oil can be added to the elastomer prior to its addition to an internal rubber mixer (e.g. Banbury rubber mixer) or be added to the rubber mixer as a separate addition to reduce the viscosity of the rubber composition both in the internal rubber mixer and for subsequent rubber processing such as in a rubber extruder.

However, it is also desired to reduce the stiffness of such tread rubber compositions, as indicated by a storage modulus G', intended to be used for low temperature winter conditions, particularly for vehicular snow driving.

It is considered that significant challenges are presented for providing such tire tread rubber compositions for maintaining both their wet traction and also low temperature (e.g. winter) performance.

To achieve such balance of tread rubber performances with tread rubber compositions containing such high Tg diene-based elastomer(s), it is recognized that concessions and adjustments would be required.

To meet such challenge of providing a silica-rich tread rubber composition containing high Tg elastomer(s) to promote wet traction combined with promoting a reduction in its stiffness at low temperatures, it is desired to evaluate:

(A) replacing the petroleum based rubber processing oil (e.g. comprised of at least one of naphthenic and paraffinic oils) with a vegetable triglyceride oil such as, for example, soybean oil to reduce its uncured rubber processing viscosity and to reduce the Tg of the rubber composition itself to thereby promote a lower cured stiffness of the tread rubber composition at lower temperatures which will positively impact the low temperature winter performance of such rubber compositions, (B) adding a high Tg uncured liquid diene-based polymer (particularly a low viscosity, high Tg, styrene/butadiene polymer) which both helps to promote wet traction performance for such a tread rubber composition and also helps to maintain a lower cured rubber stiffness value at the lower temperatures required for winter traction performance, (C) adding a traction promoting resin in the tread rubber composition, particularly at a relatively high resin loading, to promote wet traction of the sulfur cured tread rubber which contains the vegetable triglyceride oil, (D) maintaining its high precipitated silica-rich rubber reinforcing filler content to promote its wet traction.

Exemplary of past soybean oil usage, and not intended to be limiting, are U.S. Pat. Nos. 7,919,553, 8,100,157, 8,022,136 and 8,044,118.

However, while vegetable oils such as soybean oil have previously been mentioned for use in various rubber compositions, including rubber compositions for tire components, use of soybean oil together with precipitated silica reinforced high Tg diene based elastomer(s), liquid diene based polymers and traction resin(s) for tire treads to aid in promoting a combination of both wet traction and winter tread performance is considered to be a significant departure from past practice.

In the description of this invention, the terms "compounded" rubber compositions and "compounds" are used to refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

The glass transition temperature (Tg) of the solid elastomers and liquid polymer may be determined by DSC (differential scanning calorimetry) measurements, as would be understood and well known by one having skill in such art. The number average molecular weight (Mn) of the solid elastomers and liquid polymer may be determined by GPC (gel permeation chromatography) measurements as would be understood and well known by one having skill in such art. The softening point of a resin may be determined by ASTM E28 which might sometimes be referred to as a ring and ball softening point.

SUMMARY AND PRACTICE OF THE INVENTION

In accordance with this invention, a pneumatic tire is provided having a circumferential rubber tread intended to be ground-contacting, where said tread is a rubber composition comprised of, based on parts by weight per 100 parts by weight elastomer (phr):

(A) 100 phr of at least one diene-based elastomer comprised of;

(1) about 25 to about 75 phr of a styrene/butadiene elastomer having a Tg in a range of from about −35° C. to about −5° C. and an uncured Mooney viscosity (ML1+4) in a range of from about 50 to about 150, (2) about 25 to about 75 phr of high cis 1,4-polybutadiene rubber having a Tg in a range of from about −100° C. to about −109° C., (3) about 3 to about 50 phr of low molecular weight liquid styrene/butadiene polymer having a number average molecular weight in a range of from about 3,000 to about 30,000, alternately about 4,000 to about 15,000 and a Tg in a range of from about −30° C. to about 0° C., alternately from about −25° C. to about −5° C., (B) about 50 to about 250, alternately from about 75 to about 175, phr of rubber reinforcing filler comprised of a combination of precipitated silica (amorphous synthetic precipitated silica) and rubber reinforcing carbon black in a ratio of precipitated silica to rubber reinforcing carbon black of at least 9/1, together with silica coupling agent having a moiety reactive with hydroxyl groups (e.g. silanol groups) on said precipitated silica and another different moiety interactive with said diene-based elastomers and polymer, (C) about 5 to about 35, alternately from about 7.5 to about 25, phr of resin comprised of at least one of terpene, coumarone indene and styrene-alphamethylstyrene resins where such resins desirably have a softening point (ASTM E28) in a range of from about 60° C. to about 150° C., and (D) about 10 to about 50, alternately from about 20 to about 40 phr of vegetable triglyceride oil such as, for example, such oil comprised of soybean oil.

In further accordance with this invention, said tire is provided being sulfur cured.

In one embodiment, the high molecular weight styrene/butadiene elastomer having a Tg in a range of from about −35° C. to about −5° C. has an uncured Mooney viscosity (ML1+4) in a range of from about 60 to about 120.

In one embodiment, the high molecular weight of the styrene/butadiene elastomer may be evidenced by a relatively high Mooney viscosity (ML1+4) in its uncured state in a range of, for example, about 65 to about 90.

In one embodiment, the high cis 1,4 polybutadiene rubber has a cis 1,4-isomeric content of at least about 95 percent and an uncured Mooney viscosity (ML1+4) in a range of from about 50 to 100.

In one embodiment said tread rubber composition further contains up to 25, alternately up to about 15, phr of at least one additional diene based elastomer. Such additional elastomer may be comprised of, for example, at least one of cis 1,4-polyisoprene, isoprene/butadiene, styrene/isoprene and 3,4-polyisoprene rubber.

In one embodiment, said styrene/butadiene elastomer may be a functionalized elastomer containing at least one of siloxane, amine and thiol groups reactive with hydroxyl groups on said precipitated silica.

In one embodiment, said styrene/butadiene elastomer may be a tin or silicon coupled elastomer.

In one embodiment, said functionalized styrene/butadiene elastomer may be a tin or silicon coupled elastomer.

In one embodiment, said precipitated silica and silica coupling agent may be pre-reacted to form a composite thereof prior to their addition to the rubber composition.

In one embodiment, said precipitated silica and silica coupling agent may be added to the rubber composition and reacted together in situ within the rubber composition.

In embodiment, said resin may be a terpene resin comprised of polymers of at least one of limonene, alpha pinene and beta pinene and having a softening point in a range of from about 60° C. to about 140° C.

In one embodiment, said resin may be a coumarone indene resin having a softening point in a range of from about 60° C. to about 150° C.

In one embodiment, said resin may be a styrene-alphamethylstyrene resin having a softening point in a range of from about 60° C. to about 125° C., alternately from about 80° C. to 90° C. (ASTM E28), and, for example, a styrene content of from about 10 to about 30 percent.

The precipitated silica reinforcement may, for example, be characterized by having a BET surface area, as measured using nitrogen gas, in the range of, for example, about 40 to about 600, and more usually in a range of about 50 to about 300 square meters per gram. The BET method of measuring surface area might be described, for example, in the *Journal of the American Chemical Society*, Volume 60, as well as ASTM D3037.

Such precipitated silicas may, for example, also be characterized by having a dibutylphthalate (DBP) absorption value, for example, in a range of about 100 to about 400, and more usually about 150 to about 300 cc/100 g.

Various commercially available precipitated silicas may be used, such as, and not intended to be limiting, silicas from PPG Industries under the Hi-Sil trademark with designations 210, 243, etc.; silicas from Solvay with, for example, designations of Zeosil 1165MP and Zeosil 165GR, silicas from Evonik with, for example, designations VN2 and VN3 and chemically treated precipitated silicas such as for example Agilon™ 400 from PPG.

Representative examples of rubber reinforcing carbon blacks are, for example, and not intended to be limiting, are referenced in *The Vanderbilt Rubber Handbook*, 13th edition, year 1990, on Pages 417 and 418 with their ASTM designations. As indicated, such rubber reinforcing carbon blacks may have iodine absorptions ranging from, for example, 60 to 240 g/kg and DBP values ranging from 34 to 150 cc/100 g.

If desired, the vulcanizable (and vulcanized) tread rubber composition may contain an ultra high molecular weight polyethylene (UHMWPE).

Representative of silica coupling agents for the precipitated silica are comprised of, for example;

(A) bis(3-trialkoxysilylalkyl) polysulfide containing an average in range of from about 2 to about 4, alternatively from about 2 to about 2.6 or from about 3.2 to about 3.8, sulfur atoms in its connecting bridge, or (B) an organoalkoxymercaptosilane, or (C) their combination.

Representative of such bis(3-trialkoxysilylalkyl) polysulfide is comprised of bis(3-triethoxysilylpropyl) polysulfide.

It is readily understood by those having skill in the art that the vulcanizable rubber composition would be compounded by methods generally known in the rubber compounding art. In addition said compositions could also contain fatty acid, zinc oxide, waxes, antioxidants, antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from 1.5 to 6 phr being often preferred. Typical amounts of processing aids comprise about 1 to about 50 phr.

Additional rubber processing oils, (e.g. petroleum based rubber processing oils) may be included in the rubber composition, if desired, to aid in processing vulcanizable rubber composition in addition to the vegetable oil such as soybean oil, wherein the vegetable oil is the majority (greater than 50 weight percent) of the vegetable oil and rubber processing oil.

Typical amounts of antioxidants may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include stearic acid comprise about 0.5 to about 3 phr. Typical amounts of zinc oxide may comprise, for example, about 2 to about 5 phr. Typical amounts of waxes comprise about 1 to about 5 phr. Often microcrystalline waxes are used. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 1.5, phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, sulfenamides, and xanthates. Often desirably the primary accelerator is a sulfenamide. If a second accelerator is used, the secondary accelerator is often desirably a guanidine such as for example a diphenylguanidine.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The pneumatic tire of the present invention may be a race tire, passenger tire, aircraft tire, agricultural tire, earthmover tire, off-the-road tire, truck tire and the like. Usually desirably the tire is a passenger or truck tire. The tire may also be a radial or bias ply tire, with a radial ply tire being usually desired.

Vulcanization of the pneumatic tire containing the tire tread of the present invention is generally carried out at conventional temperatures in a range of, for example, from about 140° C. to 200° C. Often it is desired that the vulcanization is conducted at temperatures ranging from about 150° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. The parts and percentages are parts by weight, usually parts by weight per 100 parts by weight rubber (phr) unless otherwise indicated.

The liquid (low viscosity) diene-based polymers evaluated in the following Examples are shown in Table A. The indicated polymers are liquid cis 1,4-polyisoprene polymer and liquid styrene/butadiene polymers (liquid SBR's) identified as styrene/butadiene polymers A, B, C and D.

TABLE A

| Liquid Polymer | Styrene Content | Tg | Number Average Molecular Weight | Product |
|---|---|---|---|---|
| Cis 1,4-polyisoprene | 0 | −63° C. | 28,000 | LIR ™-30[1] |
| Styrene/butadiene A | 25 | −22° C. | 4,500 | Ricon ™ 100[2] |
| Styrene/butadiene B | 25 | −14° C. | 8,500 | SBR-820 ™[3] |
| Styrene/butadiene C | 25 | −6° C. | 10,000 | SBR 841 ™[4] |
| Styrene/butadiene D | 28 | −61° C. | 8,600 | Ricon ™ 184[5] |

[1] liquid cis 1,4-polyisoprene polymer from Kururay
[2] liquid SBR from Cray Valley
[3] liquid SBR from Kuraray
[4] liquid SBR from Kuraray
[5] liquid SBR from Cray Valley

EXAMPLE I

In this example, exemplary rubber compositions for a tire tread were prepared for evaluation for use to promote wet traction and cold weather (winter) performance.

A Control rubber composition was prepared as Sample A with a precipitated silica reinforced rubber composition containing styrene/butadiene rubber and cis 1,4-polybutadiene rubber together with a silica coupler for the precipitated silica reinforcement.

Experimental rubber compositions were prepared as Samples B through D with one or more of soybean oil, liquid styrene/butadiene polymer, liquid polyisoprene polymer and styrene-alphamethylstyrene resin being added to the rubber composition containing elastomers as styrene/butadiene rubber and cis 1,4-polybutadiene rubber.

The rubber compositions are illustrated in the following Table 1.

TABLE 1

| | Parts by Weight (phr) | | | |
|---|---|---|---|---|
| Material | Control Sample A | Exp'l Sample B | Exp'l Sample C | Exp'l Sample D |
| Styrene/butadiene rubber[1] | 55 | 60 | 60 | 60 |
| Cis 1,4-polybutadiene rubber[2] | 45 | 40 | 40 | 40 |
| Rubber processing oil[3] | 40 | 0 | 0 | 0 |
| Soybean oil[4] | 0 | 40 | 30 | 30 |
| Liquid styrene/butadiene polymer A[5] | 0 | 0 | 0 | 10 |
| Liquid cis 1,4-polyisoprene rubber[6] | 0 | 0 | 10 | 0 |
| Styrene-alphamethyl-styrene resin[7] | 10 | 20 | 20 | 20 |
| Precipitated silica[8] | 125 | 125 | 125 | 125 |
| Silica coupler[9] | 7.5 | 7.5 | 7.5 | 7.5 |
| Fatty acids[10] | 5 | 5 | 5 | 5 |
| Carbon black (carrier for silica coupler) | 1 | 1 | 1 | 1 |
| Wax | 1.5 | 1.5 | 1.5 | 1.5 |
| Antioxidants | 3 | 3 | 3 | 3 |
| Zinc oxide | 2.5 | 2.5 | 2.5 | 2.5 |
| Sulfur | 1.2 | 1.5 | 1.5 | 1.5 |
| Sulfur cure accelerators[11] | 5 | 5.25 | 5.25 | 5.25 |

[1] A functionalized, tin coupled, styrene/butadiene rubber containing a combination of siloxy and thiol groups having a Tg of about −30° C. to −10° C. and Mooney viscosity (ML1 + 4) of about 70 as SLR4602 ™ from Styron.
[2] High cis 1,4-polybutadiene rubber as BUD4001 ™ from The Goodyear Tire & Rubber Company having a Tg of about −102° C.
[3] Rubber processing oil primarily comprised of naphthenic oil
[4] Soybean oil as Sterling Oil from Stratus Food Company
[5] Liquid, sulfur vulcanizable styrene/butadiene polymer having a Tg of about −22° C.
[6] Liquid, sulfur vulcanizable polyisoprene polymer having a Tg of about −63° C.
[7] Resin as styrene-alphamethylstyrene copolymer having a softening point in a range of about 80° C. to 90° C. (ASTM E28) and a styrene content in a range of from about 10 to about 30 percent as Resin 2336 ™ from Eastman Chemical.
[8] Precipitated silica as Zeosil 1165MP ™ from Solvay
[9] Silica coupler comprised of a bis(3-triethoxysilylpropyl) polysulfide containing an average in a range of from about 2 to about 2.6 connecting sulfur atoms in its polysulfidic bridge as Si266 from Evonik. The coupler was a composite with carbon black as a carrier, although the coupler and carbon black are reported separately in the Table.
[10] Fatty acids comprised of stearic, palmitic and oleac acids
[11] Sulfur cure accelerators as sulfenamide primary accelerator and diphenylguanidine secondary accelerator The rubber Samples were prepared by identical mixing procedures, wherein the elastomers and liquid polymer with 80 phr of precipitated silica, together with silica coupler and compounding ingredients together in a first non-productive mixing stage (NP1) in an internal rubber mixer for about 4 minutes to a temperature of about 160° C. The resulting mixtures were was subsequently mixed in a second sequential non-productive mixing stage (NP2) in an internal rubber mixer to a temperature of about 160° C. with an additional 45 phr of precipitated silica. The rubber compositions were subsequently mixed in a productive mixing stage (P) in an internal rubber mixer with a sulfur cure package, namely sulfur and sulfur cure accelerator(s), for about 2 minutes to a temperature of about 115° C. The rubber compositions were each removed from its internal mixer after each mixing step and cooled to below 40° C. between each individual non-productive mixing stage and before the final productive mixing stage.

The following Table 2 illustrates cure behavior and various physical properties of rubber compositions based upon the basic formulation of Table 1 and reported herein as Control rubber Sample A and Experimental rubber Samples B through D. Where cured rubber samples are reported, such as for the stress-strain, hot rebound and hardness values, the rubber samples were cured for about 14 minutes at a temperature of about 160° C.

To establish the predictive wet traction, a tangent delta (tan delta) test was run at 0° C.

To establish the predictive low temperature (winter snow) performance, the rubber's stiffness (storage modulus G') test was run at −20° C.

TABLE 2

| | Parts by Weight (phr) | | | |
|---|---|---|---|---|
| Materials | Control A | Exp. B | Exp. C | Exp. D |
| Styrene/butadiene rubber | 55 | 60 | 60 | 60 |
| Cis 1,4-polybutadiene rubber | 45 | 40 | 40 | 40 |
| Rubber processing oil | 40 | 0 | 0 | 0 |
| Soybean oil | 0 | 40 | 30 | 30 |
| Liquid styrene/butadiene polymer A | 0 | 0 | 0 | 10 |
| Liquid polyisoprene polymer | 0 | 0 | 10 | 0 |
| Resin | 10 | 20 | 20 | 20 |
| Properties | | | | |
| Wet Traction Laboratory Prediction | | | | |
| Tan delta, 0° C. (higher is better) | 0.46 | 0.41 | 0.41 | 0.45 |
| Cold Weather (Winter) Performance (Stiffness) Laboratory Prediction | | | | |
| Storage modulus (G'), (Pa × 10$^6$) at −20° C., 10 Hertz, 3% strain (lower stiffness values are better) | 3.4 | 3.1 | 2.8 | 2.7 |
| Rolling Resistance (RR) Laboratory Prediction | | | | |
| Rebound at 100° C. | 48 | 46 | 48 | 49 |
| Additional properties | | | | |
| Tensile strength (MPa) | 11.8 | 11.8 | 11.4 | 11.8 |
| Elongation at break (%) | 470 | 598 | 564 | 615 |
| Modulus (ring) 300% (MPa) | 6.7 | 4.9 | 5 | 4.8 |
| Tear resistance[1] (Newtons) | 34 | 73 | 52 | 69 |

[1] Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force (N).

From Table 2 it is observed that:

(1) For Experimental rubber Sample B, conventional petroleum based rubber processing oil of Control rubber Sample A was replaced with soybean oil, the SBR rubber was increased to 60 phr from the 50 phr of Control rubber Sample A, the resin increased to 20 phr from the 10 phr of Control rubber Sample A and the rubber Sample cured. As a result, an improved predictive cold weather (winter) performance was obtained based on a lower storage modulus G' stiffness value of 3.1 as compared to a value of 3.4 for Control rubber Sample A. However, a loss in predictive wet traction was experienced based on a tangent delta value of 0.41 compared to 0.46 for Control rubber Sample A.

(2) For Experimental rubber Sample C, the composition of Experimental rubber Sample B was changed by replacing 10 phr of the soybean oil with 10 phr of liquid polyisoprene polymer and the rubber Sample cured. A further improvement of predictive cold weather (winter) performance was observed as indicated by a beneficially even lower storage modulus G' stiffness at −20° C. of 2.8 as compared to the value of 3.4 for Control rubber Sample A and value of 3.1 for Experimental rubber Sample B. However, similar to Experimental rubber Sample B, a loss in predictive wet traction was also experienced based on a tan delta value of 0.41 compared to 0.46 for Control rubber Sample A.

(3) Experimental rubber Sample D was similar to Experimental rubber Sample C except that 10 phr of the soybean oil of Experimental rubber Sample B was replaced with a high Tg liquid styrene/butadiene polymer instead of the liquid polyisoprene polymer of Experimental rubber Sample C. An even further improvement of predictive cold weather (winter) performance was observed as observed by a beneficially even lower storage modulus G' stiffness at −20° C. of 2.7 as compared to the value of 3.4 for Control rubber Sample A and 2.8 for Experimental rubber Sample C. However, an improvement in predictive wet traction was surprisingly discovered based on an observed tan delta value of 0.45 which compared favorably and beneficially to the value of 0.46 for Control rubber Sample A.

It is thereby concluded from Experimental rubber Sample D of this evaluation that a unique discovery was obtained of a sulfur cured rubber composition composed of high Tg styrene/butadiene rubber and high cis 1,4-polybutadiene rubber (with its low Tg of about minus 102° C.) together with the combination of soybean oil, high Tg liquid styrene/butadiene polymer (Tg of −22° C.) and resin as shown in Experimental rubber Sample D, as compared to Control rubber Sample A. The desired target of improved cold weather (winter) performance (stiffness in a sense of storage modulus G' at low temperature) without a loss of predicted wet traction (in a sense of higher tan delta values at 0° C.) for a tire tread performance was obtained from such a cured rubber composition.

Further, a discovery is observed that Experimental rubber Sample D yielded a beneficially and significantly improved tear strength resistance value of 69 Newtons compared to a value of only 34 Newtons for Control rubber Sample A while maintaining a similar hot rebound value of 49 which is predictive of maintaining a beneficially similar rolling resistance for a tire tread of similar rubber composition.

EXAMPLE II

Additional experiments were made with variations in liquid styrene/butadiene polymers (low viscosity SBR polymers).

The rubber formulation recipes of Example I were used except for the liquid polymers being variations of the liquid SBR polymers.

The experiments were composed of Control rubber Sample E with a formulation referenced in Example I, Table 1, as Control rubber Sample B, and Experimental rubber Samples F through H which contained additional liquid SBR polymers for comparison to the liquid SBR A evaluated in Example I. The liquid styrene/butadiene polymers used are reported in Table 1.

The rubber Samples were prepared and tested in the manner of Example I. The following Table 3 illustrates cure behavior and various physical properties of rubber compositions.

TABLE 3

| | Control | Parts by Weight (phr) | | |
|---|---|---|---|---|
| Materials | E | Exp. F | Exp. G | Exp. H |
| Liquid SBR polymer A, Tg = −22° C. | 10 | 0 | 0 | 0 |
| Liquid SBR polymer B, Tg = −14° C. | 0 | 10 | 0 | 0 |
| Liquid SBR polymer C, 1 Tg = −6° C. | 0 | 0 | 10 | 0 |
| Liquid SBR polymer D, Tg = −61° C. | 0 | 0 | 0 | 10 |
| SBR, solid, number average molecular weight (Mn) | 4,500 | 8,500 | 10,000 | 8,600 |
| Wet Traction, Laboratory Prediction | | | | |
| Tan delta (higher is better) Winter Performance (Stiffness) Laboratory Prediction | 0.52 | 0.53 | 0.55 | 0.49 |
| Storage modulus (G') at −20° C. (Pa × 10 6) 10 Hertz, 3 % strain (lower stiffness values are better) Rolling Resistance (RR) Laboratory Prediction | 10.8 | 12.4 | 11.9 | 12.1 |
| Rebound at 100° C. Additional properties | 51 | 49 | 50 | 48 |
| Tensile strength (MPa) | 10.9 | 11 | 11.4 | 11.5 |
| Elongation at break (%) | 522 | 539 | 514 | 542 |
| Modulus (ring) 300% (MPa) | 5.2 | 5 | 5.6 | 5.3 |
| Tear resistance (Newtons) | 38 | 33 | 38 | 33 |

From Table 3 it can be seen that all of the liquid SBR polymers with their varied range of Tgs provided the rubber compositions with similar low temperature predictive stiffness properties (G' values) ranging from 10.8 to 12.4.

However, Experimental rubber Sample H, which contained the liquid SBR with the lowest Tg of −61° C. (SBR polymer D), gave the worst predicted wet performance based on having the lowest tan delta value at 0° C. and therefore the liquid SBR polymer would be considered as having too low of a Tg for use in this rubber composition where a combination of wet traction and cold weather performance is desired.

In contrast, Experimental rubber Sample G, having the highest Tg liquid SBR polymer gave the best predicted wet traction based on its tan delta value at 0° C., while sill giving similar predicted winter traction performance based on its G' value at −20° C.

Therefore it is concluded that to achieve a combination of high predicted wet traction together with beneficially low predicted stiffness (at low atmospheric temperature) for the tire tread rubber composition, a liquid (low viscosity) styrene/butadiene polymer with a high Tg would be desired to be combined with a high Tg, high molecular weight (evidenced by having a high uncured Mooney ML1+4 viscosity), styrene/butadiene rubber in the tread rubber composition which also contains the vegetable oil (soybean oil) to aid in reducing the overall Tg of the rubber composition to promote low stiffness for cold weather winter driving conditions, the cis 1,4-polybutadiene rubber having its low Tg of about −102° C. to aid in promoting low stiffness for cold winter driving conditions and traction resin to aid on promoting the tire tread's wet traction.

It is concluded from these two laboratory studies that a liquid SBR polymer having a Tg in a range of about −30° C. to about 0° C. together with a number average molecular weight in a range of from about 3,000 to about 30,000 should be used for the rubber composition together with a solid SBR with a Tg in a range of from about −35° C. to about −5° C. and an uncured Mooney viscosity (ML1+4) in a range of from about 50 to about 150, alternatively from about 60 to about 100, to provide the beneficial combination of both improved low temperature stiffness (G') at −20° C. for cold weather winter performance and higher tan delta at 0° C. for wet traction for the silica-rich rubber composition comprised of a combination of high uncured Mooney viscosity (ML1+4) styrene/butadiene and cis 1,4-polybutadiene rubbers which contained both the aforesaid low molecular weight, high Tg, liquid SBR polymers and soybean oil and traction resin, when sulfur cured.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a circumferential rubber tread of a rubber composition comprised of, based on parts by weight per 100 parts by weight elastomer (phr):
   (A) 100 phr of styrene/butadiene elastomer and cis 1,4-polybutadiene rubber together with liquid styrene/butadiene polymer comprised of;
      (1) about 25 to about 75 phr of a styrene/butadiene elastomer having a Tg in a range of from about −35° C. to about −5° C. and an uncured Mooney viscosity (ML1+4) 100° C. in a range of from about 60 to about 100, and
      (2) about 25 to about 75 phr of high cis 1,4-polybutadiene rubber having a Tg in a range of from about −100° C. to about −109° C., a cis 1,4-isomeric content of at least about 95 percent and an uncured Mooney viscosity (ML1+4) 100° C. in a range of from about 50 to 100, together with
      (3) about 3 to about 50 phr of low molecular weight liquid styrene/butadiene polymer having a number average molecular weight in a range of from about 3,000 to about 30,000 and a Tg in a range of from about −30° C. to about 0° C.,
   (B) about 50 to about 250 phr of rubber reinforcing filler comprised of a combination of precipitated silica and rubber reinforcing carbon black in a ratio of precipitated silica to rubber reinforcing carbon black of at least 9/1, together with silica coupling agent having a moiety reactive with hydroxyl groups on said precipitated silica and another different moiety interactive with said diene-based elastomers and polymer,
   (C) about 5 to about 35 phr of traction promoting resin consisting of styrene-alphamethylstyrene resin having a softening point in a range of from about 60° C. to about 125° C. and a styrene content of from about 10 to about 30 percent, and
   (D) about 10 to about 50 phr of vegetable triglyceride oil comprised of soybean oil
   wherein said styrene/butadiene elastomer is a functionalized tin or silicon coupled elastomer having functional groups comprised of at least one of amine, siloxy and thiol groups reactive with hydroxyl groups on said precipitated silica.

2. The tire of claim 1 wherein said tire is sulfur cured.

3. The tire of claim 1 wherein said tread rubber composition further contains up to 25 phr of at least one additional diene based elastomer comprised of at least one of cis 1,4-polyisoprene isoprene/butadiene, styrene/isoprene, and 3,4-polyisoprene rubber.

4. The tire of claim 1 wherein said precipitated silica is a pre-formed composite of said precipitated silica and silica coupling agent.

* * * * *